(12) United States Patent
Schmitt et al.

(10) Patent No.: US 11,916,210 B2
(45) Date of Patent: Feb. 27, 2024

(54) BATTERY HOUSING FOR A BATTERY MODULE, BATTERY MODULE WITH A BATTERY HOUSING AND MOTOR VEHICLE

(71) Applicant: Robert Bosch GmbH, Stuttgart (DE)

(72) Inventors: Markus Schmitt, Tamm (DE); Benjamin Kopp, Remseck am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 17/399,555

(22) Filed: Aug. 11, 2021

(65) Prior Publication Data
US 2022/0052395 A1    Feb. 17, 2022

(30) Foreign Application Priority Data
Aug. 12, 2020   (DE) .......................... 102020210202.3

(51) Int. Cl.
| | |
|---|---|
| *H01M 10/6556* | (2014.01) |
| *H01M 10/613* | (2014.01) |
| *B60L 50/64* | (2019.01) |
| *H01M 10/625* | (2014.01) |
| *H01M 10/6567* | (2014.01) |
| *B60L 58/26* | (2019.01) |

(52) U.S. Cl.
CPC ......... *H01M 10/6556* (2015.04); *B60L 50/64* (2019.02); *B60L 58/26* (2019.02); *H01M 10/613* (2015.04); *H01M 10/625* (2015.04); *H01M 10/6567* (2015.04); *B60L 2240/545* (2013.01); *H01M 2220/20* (2013.01)

(58) Field of Classification Search
CPC ........... H01M 10/6556; H01M 10/625; H01M 10/6567; H01M 2220/20; B60L 58/26; B60L 2240/545
See application file for complete search history.

(56) References Cited

U.S. PATENT DOCUMENTS

| | | | | |
|---|---|---|---|---|
| 2018/0138563 | A1* | 5/2018 | Behm | ............... H01M 10/0481 |
| 2020/0168967 | A1* | 5/2020 | Kopp | ................ H01M 10/6572 |
| 2020/0176838 | A1* | 6/2020 | Kopp | .................. H01M 10/613 |

FOREIGN PATENT DOCUMENTS

| | | |
|---|---|---|
| DE | 112015003530 T5 | 4/2017 |
| DE | 102016222264 A1 | 5/2018 |
| DE | 102018220937 A1 | 6/2020 |
| DE | 102018220939 A1 | 6/2020 |
| WO | 2017045877 A1 | 3/2017 |

* cited by examiner

*Primary Examiner* — Adam A Arciero
(74) *Attorney, Agent, or Firm* — Michael Best & Friedrich LLP

(57) ABSTRACT

A battery housing (10) for a battery module, wherein the battery housing (10) has a main body (11). The main body (11) comprises an interior (12) for arrangement of at least one battery cell of the battery module, a housing base (13) and at least one housing sidewall (14*a,b*). At least a section (20) of the main body (11) has a diecast (15) with a channel region (21), comprising at least one groove-shaped channel (22) for conveying temperature control fluid for controlling the temperature of the at least one battery cell of the battery module. The channel region (21) is covered by at least one cover element (30) in a fluid-tight manner to form a closed channel structure (23*b*). The cover element (30) and/or the diecast (15) have, in the channel region (21), at least one structure (40) around which temperature control fluid can flow for increasing heat transfer.

16 Claims, 10 Drawing Sheets

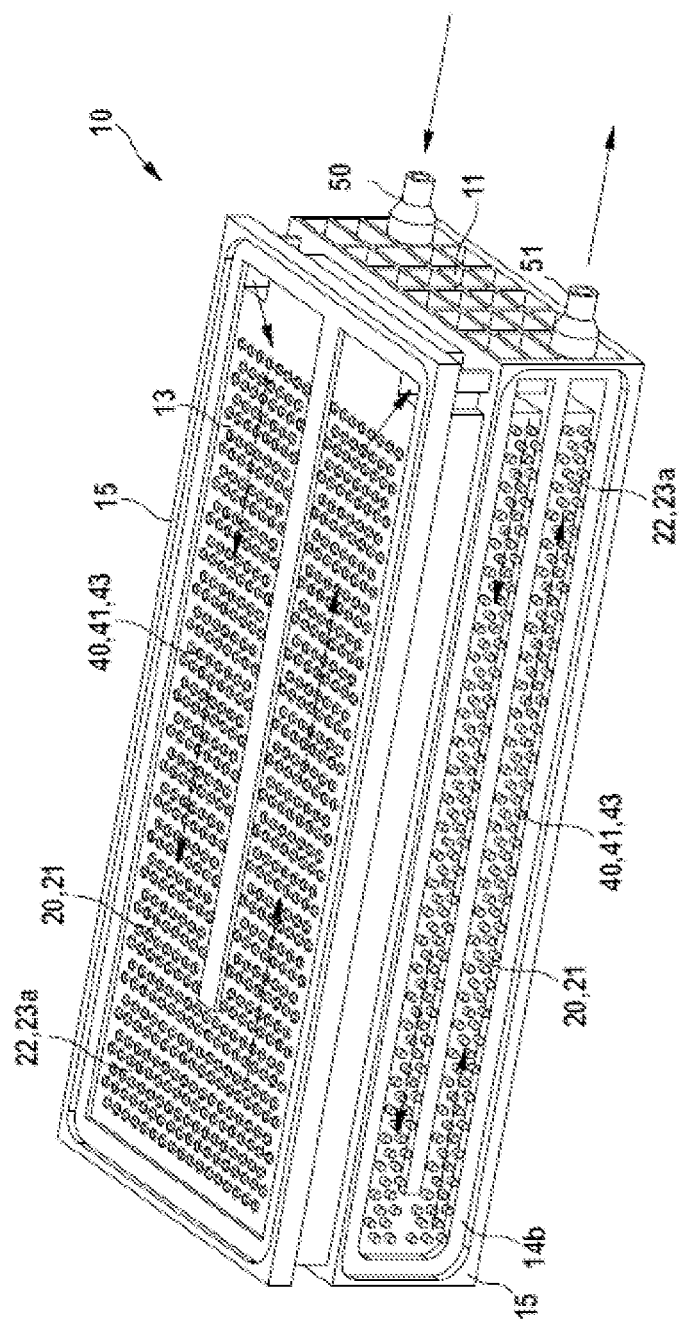

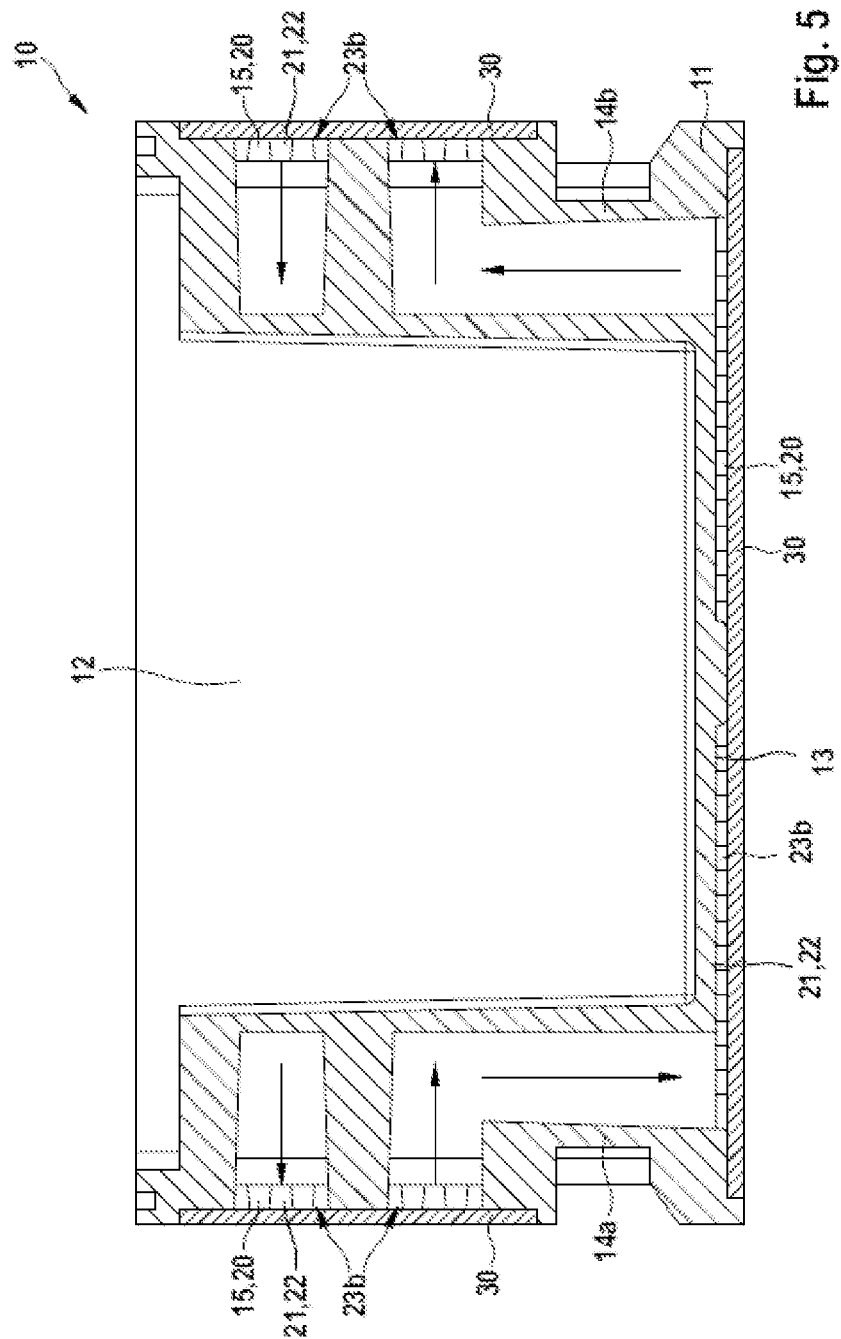

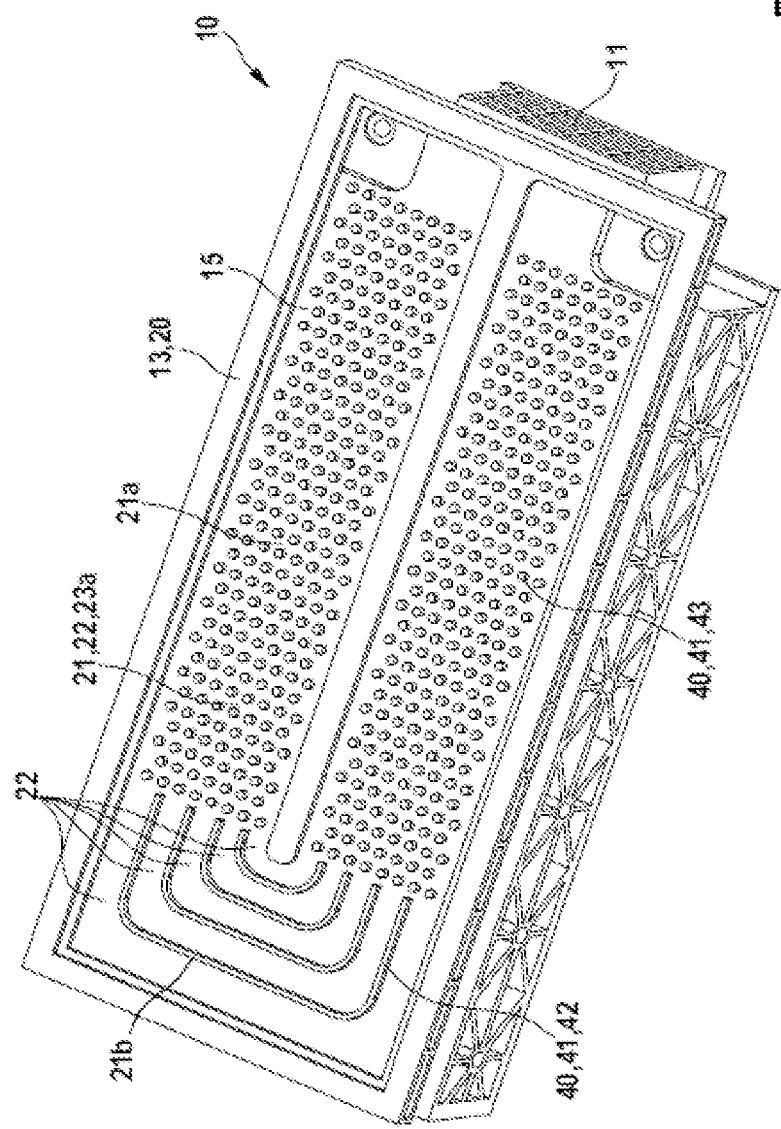

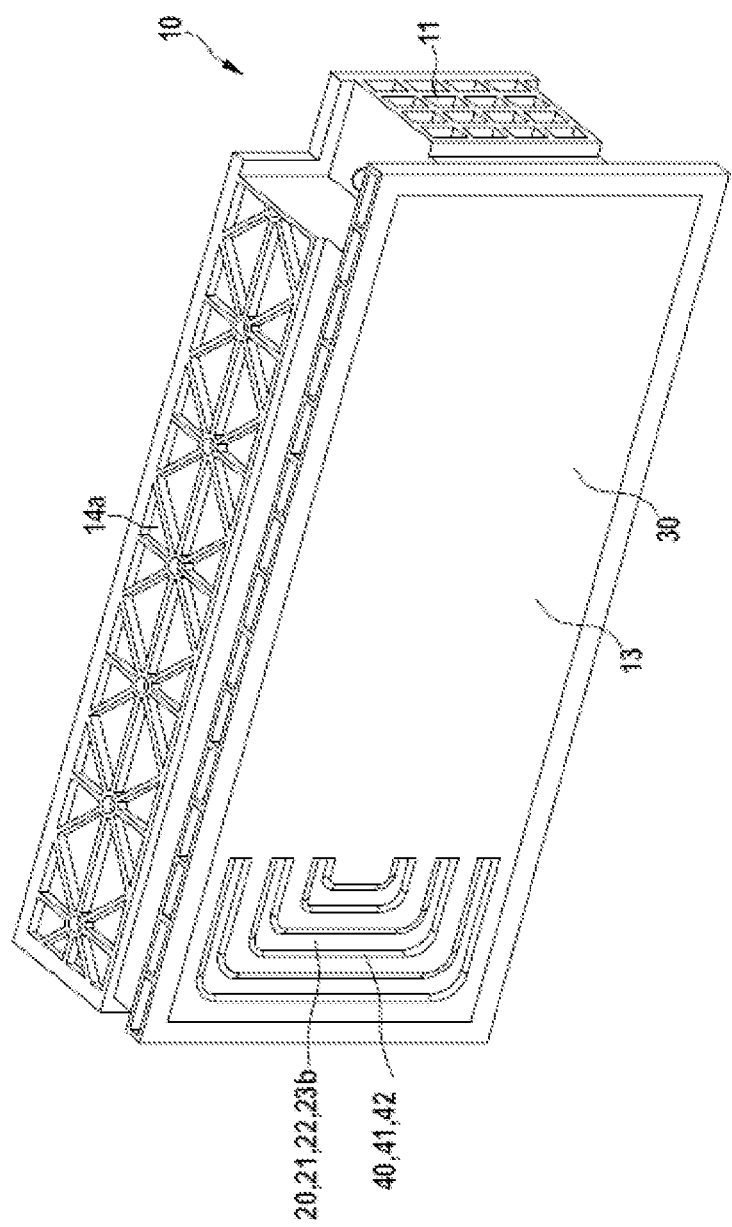

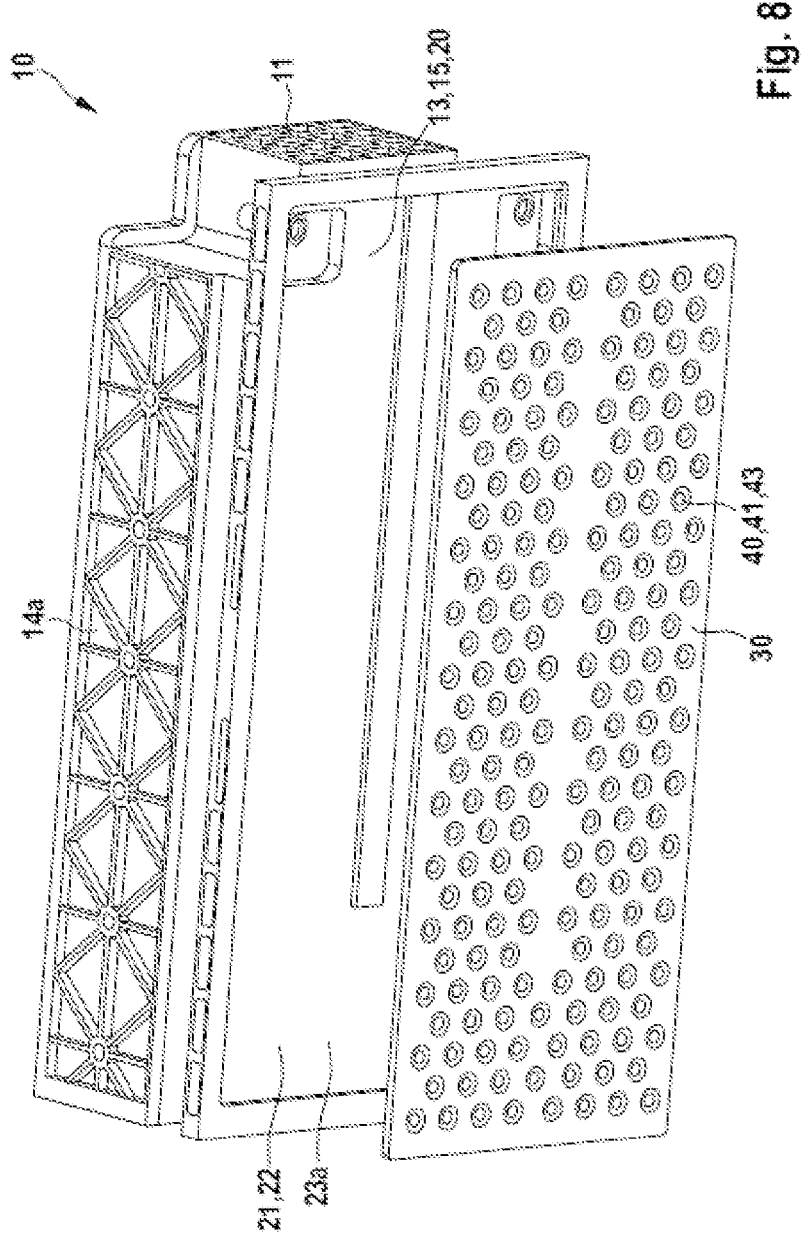

BATTERY HOUSING FOR A BATTERY MODULE, BATTERY MODULE WITH A BATTERY HOUSING AND MOTOR VEHICLE

BACKGROUND OF THE INVENTION

A battery is an electrochemical energy storage means. Battery systems are used both in stationary applications and in motor vehicles, and also in electronic devices. Individual battery cells are combined here to form battery modules. Battery modules may in turn be combined to form battery systems. On account of the multitude of different motor vehicle installation spaces, variable module sizes are required. Only in this way can the installation space available be exploited optimally. Moreover, high demands are placed on the battery modules with regard to reliability, safety, performance and lifetime.

On account of their high energy density, lithium ion battery cells in particular are used as energy storage means for electrically driven motor vehicles. Lithium ion or lithium polymer battery cells heat up as a result of chemical conversion processes, particularly in the case of rapid energy release or absorption. For an optimal power balance, a sufficiently high lifetime and safe operation of such battery modules, it is important to operate these within an optimal temperature range. The optimal operating temperature of lithium ion battery modules is about +5° C. to +35° C. Over and above an operating temperature of about +40° C., the lifetime of the battery cells is reduced. In order to achieve the lifetime requirement of about 8-10 years, sufficient thermal conditioning of the battery cells is therefore required. In all states of operation, the battery cells must be kept in a thermally uncritical state below +40° C. In order to achieve equal aging of the individual battery cells, the temperature gradient from battery cell to battery cell must also be only small.

For those reasons, the battery module or battery system is deliberately heated or cooled, or in other words the temperature is controlled. In the context of the application, the expression "temperature control" means both heating and cooling of the battery cells.

As is well known, the temperature of the battery cells is controlled by fluid temperature control with a water/glycol mixture. In the context of the application, the term "fluid" especially comprises a temperature control fluid, for example a cooling fluid or a coolant, especially a water/glycol mixture. This is typically guided through channels in cooling plates disposed beneath the battery modules. The supply of the cooling plates is achieved with a cooling fluid hose system with corresponding further components in a cooling circuit. As is well known, the guiding of fluid with the channels is integrated into the battery housing in order to be able to dispense with an additional component and to shorten the thermal pathway of the cooling fluid to the battery cell. Such a battery housing is known by way of example from WO 10 2017 045 877 A1. This presents a diecast with channel system integrated into the base, which is cohesively bonded to a cover element, and hence can form a closed channel structure for guiding of the cooling fluid.

It has disadvantageously been found that, when linear flow channels are used, heat transfer from the battery cell into the temperature control fluid decreases significantly over the length of the channel. Moreover, the flow of the temperature control fluid is laminar at customary volume flow rates and acceptable pressure drops, which leads to low heat transfer. This is a parallel laminar flow in the fluid where barely any heat exchange takes place between the layers in vertical direction parallel to the channel height H of the fluid.

SUMMARY OF THE INVENTION

The present invention discloses a battery housing and a battery module and a motor vehicle.

Features and details that are described in connection with the battery housing of the invention are of course also applicable here in connection with the battery module of the invention and the motor vehicle, and vice versa in each case, such that the disclosure in relation to the individual aspects of the invention is or may always be mutual.

In a first aspect, the present invention discloses a battery housing for a battery module, wherein the battery housing has a main body. The main body comprises an interior for arrangement of at least one battery cell of the battery module, a housing base and at least one housing sidewall. At least a section of the main body has a diecast or die-cast part with a channel region, comprising at least one groove-shaped channel for conveying temperature control fluid for controlling the temperature of the at least one battery cell of the battery module. The channel region is covered by at least one cover element in a fluid-tight manner to form a closed channel structure. The cover element and/or the diecast have, in the channel region, at least one structure around which temperature control fluid can flow for increasing heat transfer.

The battery housing may especially be used for a motor vehicle, especially an electrical or hybrid vehicle, or generally for electronic devices. More particularly, the battery housing may generally be used for all products in which the temperature of components is to be controlled, for example electrochemical energy storage means, especially lithium ion batteries or components of these.

The main body may be dimensionally stable. The main body may be resistant to pressure and essentially maintain its shape under pressure. The main body may take the form of a box and especially have a cuboidal interior. In addition, the main body may be thermally conductive. The section of the main body having the diecast with the channel region is preferably formed by the housing base or a housing sidewall. Alternatively, the section may be formed by a housing cover. More preferably, multiple sections of the main body are provided, each of which has a diecast with a channel region, wherein the sections are formed by the housing base and at least one housing sidewall. The main body preferably has further necessary components for formation of a temperature control fluid circuit, for example at least one entry opening and one exit opening for temperature control fluid, which may take the form of connecting stubs by way of example.

The channel region of the invention is preferably disposed in the diecast. More particularly, the channel region is formed on a surface of the diecast facing the battery cells whose temperature is to be controlled. In other words, the channel region preferably refers to a surface on the diecast on which at least one channel for conveying temperature control fluid is formed. There are preferably multiple channels disposed in the channel region, which may be connected to one another to form a temperature control fluid flow. Preferably, the at least one channel or the channels each take the form of grooves, preferably by means of a semicircular cross section. In other words, the at least one channel is provided with an open side, which forms an open channel structure in the channel region of the diecast. The channel region is covered by at least one cover element in a fluid-tight manner to form a closed channel structure. In other words, a closed channel structure is disposed between the diecast and the cover element, which is formed by the groove-shaped channel and the cover element. The cover element is preferably in plate form and especially connected to the diecast in a form-fitting manner in order to provide the fluid-tight cover, which forms a closed channel structure. By virtue of the closed channel structure, it is possible to guide temperature control fluid, especially cooling fluid, within the battery housing in operation of the battery cells. In other words, the temperature control fluid flows through the channels in the channel region or through the closed channel structure formed.

The cover element and/or the diecast have, in the channel region, at least one structure around which temperature control fluid can flow for increasing heat transfer. In other words, the structure is disposed in the channel region or in the closed channel structure such that temperature control fluid flows around the structure in the closed channel structure in operation of the battery module, or it is at least partly surrounded by temperature control fluid. In other words, the structure is preferably disposed between the cover element and the diecast in the channel region. The structure preferably extends at least partly, especially essentially completely, into the closed channel structure. More preferably, the diecast has the at least one structure in the channel region. In addition, the cover element may also have the structure within the channel region of the diecast. In other words, the structure may be formed either in the cover element or in the diecast, and be disposed in the channel region in each case, in order for temperature control fluid to be able to flow around it.

The invention has the advantage that, by means of the structure around which temperature control fluid can flow, a heat-exchanging or heat-transferring surface area can be significantly increased, and hence the heat transfer between the temperature control fluid and the battery cells whose temperature is to be controlled can be increased. It is thus possible to significantly improve the temperature control of the battery cells overall. In addition, it is possible to optimize the flow regime of the temperature control fluid. In particular, it is possible to implement different flow regimes according to the requirement on pressure drop and cooling performance. In addition, the invention has the advantage that the temperature control fluid-guiding channel region is preferably implemented within the diecast of the section of the main body, which means that no additional cooling plates are needed and a cost benefit arises. In addition, the temperature control fluid-guiding channel region is disposed outside the battery cell interior, which means that, in the event of any leaks in the temperature control fluid circuit, no temperature control fluid can get into the battery cells, which increases the reliability of the battery module.

It is advantageously the case that the structure takes the form of a multitude of flow elements for influencing the flow of the temperature control fluid, which are arranged offset to one another, especially homogeneously, in the channel region. More preferably, the flow elements are disposed within the channel of the channel region. The flow elements may preferably be arranged here in parallel rows and columns. More particularly, the flow elements form a homogeneous pattern in the channel region, which can influence the flow of the temperature control fluid in the channel region in a controlled manner. In other words, the flow elements are disposed at fixed positions in the channel region, especially in the at least one channel. This has the advantage that an optimized flow structure can be provided with regard to pressure drop and heat transfer. Further advantageously, dead zones that occur in the flow of the temperature control fluid, for example in deflection regions in the case of U-shaped channels, can be avoided by means of controlled influence on the flow of the temperature control fluid by the flow elements.

In one embodiment of the invention, it is preferably the case that the multitude of flow elements takes the form of a multitude of flow-guiding partitions or of a multitude of flow projections that are especially circular or droplet-shaped or rod-shaped, or of a combination thereof. More particularly, it is possible by means of the embodiment of the flow-guiding partitions to avoid occurrence of dead zones in deflection regions of the channel, especially of the U-shaped channel. Alternatively, it is possible with preference to arrange circular flow projections offset to one another in the channel region, in order to deflect the flow of the temperature control fluid in a controlled manner and to influence or disrupt laminar flow of the temperature control fluid. The flow projections project here into the channel, in order for temperature control fluid to flow around them in operation of the battery module. This advantageously leads to an increase in heat transfer by controlled mixing of the temperature control fluid. It is possible with preference to use any geometric shapes for the flow elements that enable a controlled influence on the flow of the temperature control fluid. It is also preferably conceivable that different geometric shapes of the flow elements are combined in different regions of the channel. By way of example, it is conceivable with preference that the channel is U-shaped and has circular flow elements in the elongated straight channel subregions, with flow-guiding partitions provided as flow elements in the U-shaped channel subregion.

It is preferably the case that the structure is integrated into the cover element and/or the diecast, especially by means of a deep drawing method. It is preferably conceivable that the structure and the cover element or the diecast are in one-piece form. It may preferably be the case that the structure is introduced into the covering element and/or into the diecast. More preferably, the structure is integrated into the diecast. This has the advantage that the structure can be integrated directly in the diecasting process for production of the diecast.

In an alternative embodiment, the channel region has multiple channels having different channel diameters, especially wherein the channel diameter increases outward in radial direction. More particularly, for this purpose, flow-guiding partitions may be provided as flow elements for subdivision of the channel region into multiple channels. By way of example, the flow-guiding partitions may be disposed only on one side of the diecast of the housing base. In a preferred embodiment, the channel region may be divided into a first channel, a second channel and a third channel. In this case, the channels are U-shaped, in which case the curvature of the channels may be arranged by way of example on the left-hand side of the diecast of the housing base. More particularly, the first channel is disposed on the inside in the direction of the center of the diecast, with the third channel disposed on the outside of the diecast. The second channel is disposed between the first and third channels. Proceeding from the center of the diecast of the housing base, the radial direction extends in each case toward the corners of the diecast of the housing base. By way of example, the channel diameter of the channels increases outward in the direction of the corners of the diecast in radial direction. In other words, the channel diameter of the first inner channel is smaller than the channel diameter of the second channel, which is smaller in turn than the channel diameter of the third channel. This especially has the advantage that the different channel diameters allow pressure drop in the channels to be homogenized.

It is advantageously the case that the at least one channel is in U-shaped or meandering form in the channel region. More particularly, it is possible to provide a single channel or multiple mutually connected channels. In general, any geometric shape of the channel may be provided. For instance, linear channels are likewise conceivable.

In one embodiment of the invention, it is preferably the case that the housing base and two housing sidewalls, in order to increase a temperature control area and/or to increase crash security of the battery housing, each have a diecast having a channel region comprising at least one groove-shaped channel for conveying temperature control fluid for controlling the temperature of the at least one battery cell of the battery module, wherein the channel region is covered by at least one cover element in a fluid-tight manner to form a closed channel structure, especially wherein the cover element is cohesively bonded to the diecast by means of friction stir welding. In other words, this achieves temperature control of the battery module by means of base cooling and side cooling, in which case it is especially possible to use two sides of the battery housing. It is preferably the case here that the housing base and one housing sidewall in each case each have a diecast with a channel region and a corresponding cover element. More particularly, the cover elements may each be cohesively bonded, especially by friction stir welding, to the respective diecast in a fluid-tight manner. The use of three cooling surfaces of the battery housing, especially of the housing base and the two housing sidewalls, can distinctly increase the cooling performance compared to pure base cooling by virtue of the additional cooling surfaces. Further advantageously, the additional cooling surfaces do not require any additional installation space, which allows a compact battery housing to be provided. Further advantageously, the additional side cooling via the housing sidewalls can achieve homogenization of the temperature profile in the vertical direction of the battery module. In addition, it is advantageously possible, via the sandwich design by means of a diecast and a corresponding cover element in the respective housing sidewall and the housing base, to significantly improve crash safety of the battery module in the event of an outside impact. In particular, a cohesive bond of the respective diecast to the respective cover element constitutes a very stiff sandwich structure that offers high resistance to deformation. This can increase the safety of the battery module overall. In addition, it is preferably possible, in the case of a severe outside impact in the event of a crash, for the weld seam of the friction stir weld to break first, especially with removal of temperature control fluid to the outside, and preferably without penetration into the interior of the battery housing with the battery module. This can protect the battery module even in the event of a severe outside impact.

In an illustrative embodiment, there may be series flow through the battery housing by means of one base cooling and two side cooling systems. More particularly, the diecast with the channel region and the cover element of the housing base and the two housing sidewalls here each form a flow space. It is preferable here that three flow spaces are formed by the housing base and two opposite housing sidewalls. By way of example, the temperature control fluid can flow through an entry opening, especially an entry stub, into the first flow space formed by a first housing sidewall. By way of example, it is possible here to provide a single U-shaped channel in the channel region of the diecast of the first housing sidewall. Thus, the temperature control fluid flows by way of example in a U shape along the longitudinal side of the first housing sidewall. The channel in the first housing sidewall is preferably connected to a channel of the channel region of the diecast of the housing base. Thus, the temperature control fluid can flow from the channel region of the first housing sidewall into the channel region of the diecast of the housing base. In other words, the temperature control fluid can flow from the first flow space of the first housing sidewall into the second flow space of the housing base. The channel of the channel region of the diecast of the housing base, likewise by way of example, takes the form of a single U-shaped channel. It is thus possible for the temperature control fluid to flow in a U shape along the longitudinal side of the housing base. The channel of the housing base is also connected to a channel of the channel region of the diecast of the second housing sidewall. It is thus possible for the temperature control fluid to flow from the channel region of the housing base into the channel region of the second housing sidewall. In other words, the temperature control fluid can flow from the second flow space of the housing base into the third flow space of the second housing sidewall. By way of example, it is possible here to provide a single U-shaped channel in the channel region of the diecast of the second housing sidewall. The temperature control fluid thus flows by way of example in a U shape along the longitudinal side of the second housing sidewall. The channel of the diecast of the second housing sidewall is preferably connected to an exit opening, especially an exit stub. In general, further geometrically different flow regimes are conceivable in a variable number of flow spaces. The number of channels in the channel region and their geometric design, and the number of flow spaces, can be matched flexibly to the demands of the battery cell temperature control. For example, temperature control fluid may flow first through the channel region of the housing base, and the temperature control fluid stream may be divided in parallel in order to flow through the channel regions of the two opposite housing sidewalls in parallel.

It is preferably the case that the battery housing has at least one thermal contact element for contacting of the at least one battery cell of the battery module with the battery housing, especially a gap pad or a gap filler or a thermally conductive adhesive or a thermally conductive encapsulating compound. In other words, by means of the thermal contact element, the battery cells can be thermally attached to the battery housing in the interior of the battery housing. The thermal contact element may preferably be disposed here at the housing base and/or at the housing sidewall. Thermal attachment of the battery cells to the battery housing is also conceivable via filling of the gap between the battery cells and the battery housing by a thermally conductive encapsulating compound.

In a second aspect, the present invention discloses a battery module having a battery housing of the invention, wherein at least one battery cell is disposed in the interior of the battery housing. In particular, multiple individual battery cells are disposed here in the battery housing. The multiple individual battery cells may be connected in series and/or in parallel by means of cell connectors. The battery module according to the second aspect of the invention thus has the same advantages as already described for the battery housing in the first aspect of the invention. The battery module may especially be used for a motor vehicle, especially an electrical or hybrid vehicle.

In a third aspect, the present invention discloses a motor vehicle, especially an electrical or hybrid vehicle, having a battery module of the invention. The motor vehicle in the third aspect of the invention thus has the same advantages as already described for the battery module in the second aspect of the invention.

BRIEF DESCRIPTION OF THE DRAWINGS

Further measures that improve the invention will be apparent from the description of some working examples of the invention that follows, these being shown schematically in the figures. All features and/or advantages that are apparent from the claims, the description or the drawings, including construction details, spatial arrangements and process steps, may be essential to the invention either on their own or in the various combinations. It should be noted here that the figures are merely of descriptive character and are not intended to restrict the invention in any way.

The figures show, in schematic form.

In the figures that follow, identical reference numerals are used for the same technical features of different working examples too.

DETAILED DESCRIPTION

Figure 1:
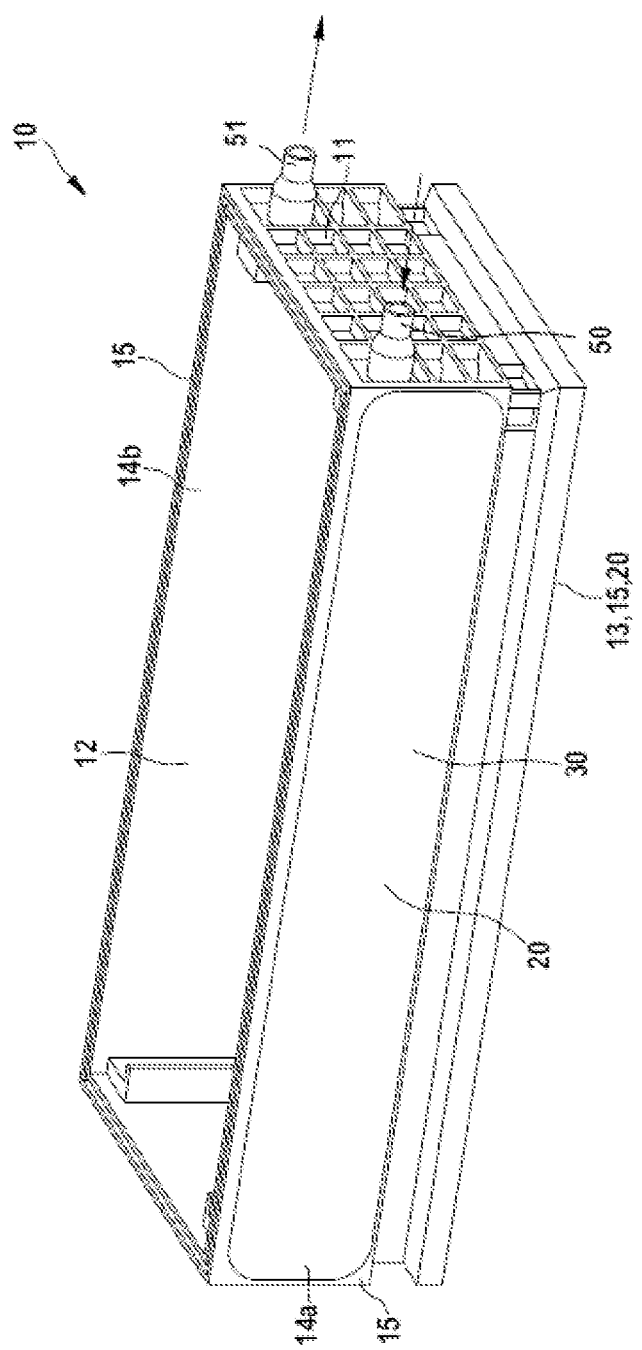
FIG. 1 a perspective view of an inventive battery housing in a first embodiment, showing one cover element, FIG. 2 a perspective bottom view of an inventive battery housing according to FIG. 1, showing two cover elements, FIG. 3 a perspective view of an inventive battery housing according to FIG. 1 with no cover element, FIG. 4 a perspective bottom view of an inventive battery housing according to FIG. 1 with no cover elements, FIG. 5 a cross-sectional view of an inventive battery housing according to FIG. 1, showing three cover elements, FIG. 6 a perspective bottom view of an inventive battery housing in a further embodiment with no cover element, FIG. 7 a perspective bottom view of an inventive battery housing according to FIG. 6, showing the cover element, FIG. 8 a perspective exploded view of an inventive battery housing in a further embodiment, showing the cover element, FIG. 9a a perspective view of a cover element for an inventive battery housing in a further embodiment, FIG. 9b a perspective view of a cover element for an inventive battery housing in a further embodiment.

FIG. 1 shows a perspective view of an inventive battery housing 10 in a first embodiment, showing one cover element 30. The battery housing 10 is for a battery module (not shown).

The battery housing 10 has a main body 11 which is in cuboidal form by way of example and has an interior 12 for arrangement of at least one battery cell of the battery module. The main body 11 further comprises a housing base 13 and four housing sidewalls. What is shown here by way of example, in a fully visible manner, is a first housing sidewall 14a in perspective view of the battery housing 10. Opposite that is disposed a second housing sidewall 14b. The housing sidewall 14a has, as a section 20 of the main body 11, a diecast 15 with a channel region (not shown) comprising at least one groove-shaped channel for conveying temperature control fluid for controlling the temperature of the at least one battery cell of the battery module. The channel region (not shown) is covered by a cover element 30 in a fluid-tight manner to form a closed channel structure. The cover element 30 is in plate form by way of example. Both the cover element 30 and the diecast 15 may be formed from a thermally conductive material. The cover element 30 is preferably cohesively bonded to the diecast 15 of the first housing sidewall 14a.

In addition, both the housing base 13 and the second housing sidewall 14b each have, as a further section 20 of the main body 11, a further diecast 15 with a channel region (not shown) comprising at least one groove-shaped channel for conveying temperature control fluid for controlling the temperature of the at least one battery cell of the battery module. The channel region (not shown) of the diecast 15 of the housing base 13 and the second housing sidewall 14b is likewise covered in each case by a cover element (not shown) in a fluid-tight manner to form a closed channel structure. In summary, the second housing sidewall 14b and the housing base 13, analogously to the above-described first housing sidewall 14a, are formed by a diecast 15, a channel region 21 and a cover element 30. Analogously, the respective cover elements 30 are preferably cohesively bonded to the diecast 15 of the second housing sidewall 14b and to the diecast 15 of the housing base 13.

The preferred sandwich design by means of a diecast and a corresponding cover element in the respective housing sidewall and the housing base has the advantage that the crash safety of the battery module in the event of an outside impact can be significantly improved. In particular, a cohesive bond of the respective diecast to the respective cover element constitutes a very stiff sandwich structure that offers high resistance to deformation. This can increase the safety of the battery module overall.

By way of example, the respective diecast 15 of the first and second housing sidewalls 14a,b and of the housing base 13 furthermore has, in the channel region, at least one structure (not shown) around which temperature control fluid can flow for increasing heat transfer.

Disposed at the housing sidewall adjoining the first housing sidewall 14a, by way of example, is an entry opening 50 and an exit opening 51 for temperature control fluid. The entry opening 50 and the exit opening 51 take the form, by way of example, of an entry stub and an exit stub. The supply of the entry opening 50 and the exit opening 51 with temperature control fluid is achieved by means of an appropriate hose system (not shown) with appropriate further components in a temperature control fluid circuit. The temperature control fluid is preferably intended for cooling of the battery cells of the battery module and may take the form, for example, of a water/glycol mixture. The flow direction of the temperature control fluid within the battery housing 10 is described in detail with regard to FIG. 3.

Figure 2:
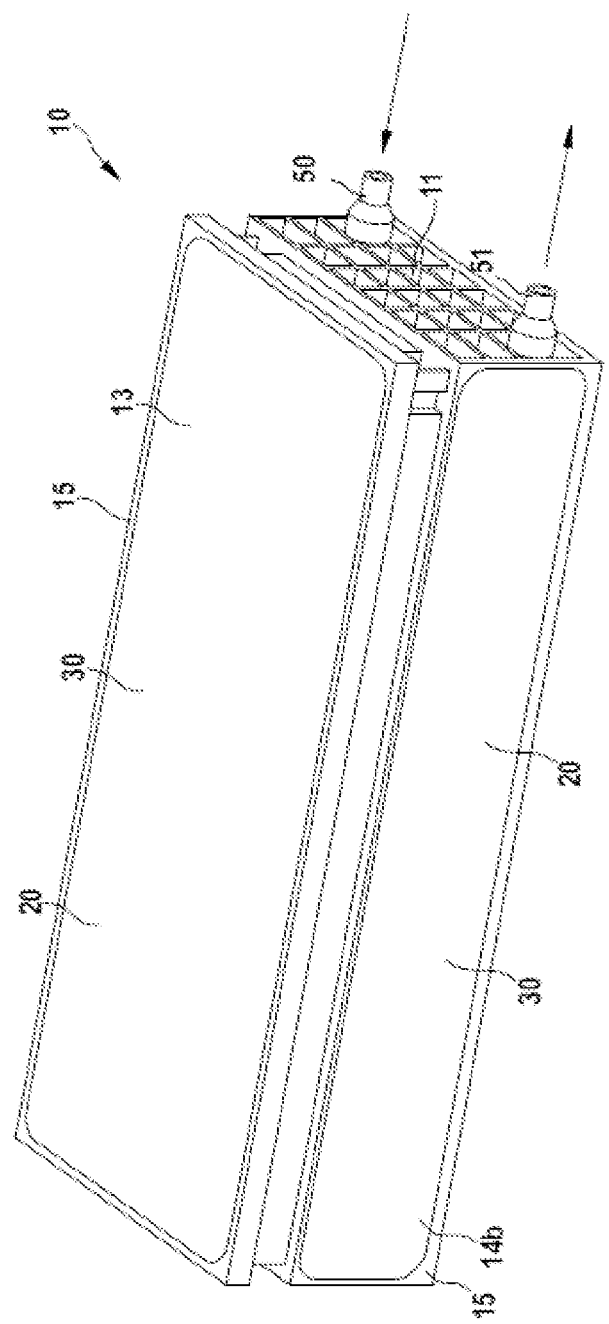

FIG. 2 shows a perspective bottom view of an inventive battery housing 10 according to FIG. 1. FIG. 2 accordingly has the same components described with regard to FIG. 1. In particular, FIG. 2 shows the housing base 13 in a fully visible manner, which has a diecast 15 as a section 20 of the main body 11. The diecast 15 of the housing base 13 comprises a channel region (not shown) comprising at least one groove-shaped channel for conveying temperature control fluid for controlling the temperature of the at least one battery cell of the battery module. The channel region (not shown) is covered by a cover element 30 in a fluid-tight manner to form a closed channel structure. The cover element 30 is preferably cohesively bonded to the diecast 15 of the housing base 13. In summary, the housing base 13 as a section of the main body 11 and the second housing sidewall 14b as a section of the main body 11 preferably each have a diecast 15 with a channel region 21 and a cover element 30. Consequently, in FIGS. 1 and 2, by way of example, a base cooling system and two side cooling systems of the battery module are implemented. This has the advantage that the cooling output can be distinctly increased compared to pure base cooling by the additional side cooling surfaces.

Figure 3:
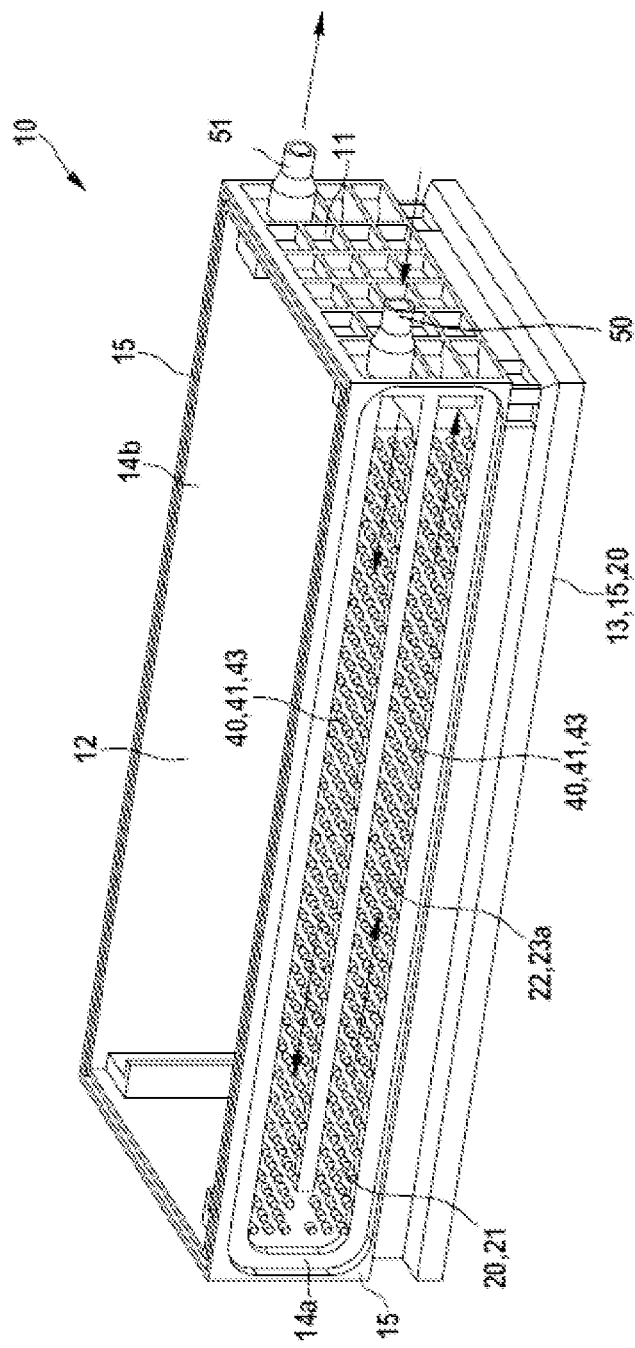

FIG. 3 shows a perspective view of an inventive battery housing 10 according to FIG. 1, with no cover element shown. FIG. 3 accordingly has the same components described with regard to FIG. 1. By contrast with FIG. 1, the battery housing 10 in FIG. 3 is shown without cover element 30, in order to illustrate the inventive channel region 21. More particularly, FIG. 3 shows, by way of example, the design of the channel region 21 with respect to the first housing sidewall 14a.

The housing sidewall 14a has a diecast 15 as a section 20 of the main body 11. A channel region 21 is formed in the diecast 15. The channel region 21 comprises a groove-shaped channel 22 having a semicircular cross section. In other words, the channel 22 is provided with an open side, which forms an open channel structure 23a in the channel region 21 of the diecast 15. By means of the fluid-tight covering by the cover element 30 (not shown), a closed channel structure is formed. The cover element 30 concludes the open side of the channel 22 of the open channel structure 23a. For this purpose, the cover element 30 is preferably cohesively bonded to the diecast 15 of the first housing sidewall 14a. The channel 22 is also U-shaped and serves to convey temperature control fluid to control the temperature of the at least one battery cell of the battery module.

For example, temperature control fluid can flow into the main body 11 through the entry opening 50 and be guided through the channel 22 of the first housing sidewall 14a. The flow direction is illustrated in the figures by means of the arrows within the channel region 21. Thus, the temperature control fluid flows by way of example in a U shape along the longitudinal side of the first housing sidewall 14a. The channel 22 of the diecast 15 of the first housing sidewall 14a is preferably connected to a channel 22 of the channel region 21 of the diecast 15 of the housing base 13. It is thus possible for the temperature control fluid to flow from the channel region 21 of the first housing sidewall 14a into the channel region 21 of the housing base 13. The channel 22 of the channel region 21 of the diecast 15 of the housing base 13, likewise by way of example, takes the form of a single U-shaped channel 22. The temperature control fluid can thus flow in a U shape along the longitudinal side of the housing base 13. The channel 22 of the housing base 13 is also connected to a channel 22 of the channel region 21 of the diecast 15 of the second housing sidewall 14b. It is thus possible for the temperature control fluid to flow from the channel region 21 of the housing base 13 into the channel region 21 of the second housing sidewall 14b. By way of example, it is possible here to provide a single U-shaped channel 22 in the channel region 21 of the diecast 15 of the second housing sidewall 14b. The temperature control fluid thus flows by way of example in a U shape along the longitudinal side of the second housing sidewall 14b. The channel 22 of the second housing sidewall 14b is also connected to the exit opening 51.

In summary, there is a serial flow through the battery housing 10 by means of a base cooling system and two side cooling systems. It should generally be emphasized here that the flow direction of the temperature control fluid can be adjusted variably to the demands of the battery module. It is thus generally conceivable to use various combinations with a base cooling system and, by way of example, one side cooling system or a multitude of side cooling systems. For this purpose, the flow direction is preferably flexibly adjustable and may be provided, for example, in series or parallel.

By way of example, the diecast 15 of the housing sidewall 14a in the channel region 21 has a structure 40 around which temperature control fluid can flow for increasing heat transfer. For this purpose, the structure 40 takes the form, by way of example, of a multitude of flow elements 41 for influencing the flow of the temperature control fluid. The flow elements 41 are formed in the channel 22 of the channel region 21 of the diecast 15. In other words, the flow elements 41 are integrated into the channel 22 or into the diecast 15, especially by means of a deep drawing method. By way of example, the flow elements 41 project into the open channel structure 23a, in order for temperature control fluid to flow around them in operation of the battery module.

The flow elements 41 are also arranged homogeneously offset from one another in the channel 22 of the channel region 21 of the diecast 15. The flow elements 41 are arranged in parallel rows and form a homogeneous pattern in the channel 22 of the channel region 21. This has the advantage that the flow of the temperature control fluid in the channel 22 can be influenced in a controlled manner. In this working example, the individual flow elements 41 take the form of circular flow projections 43. The flow projections 43 project into the channel 22 in order for temperature control fluid to flow around them in operation of the battery module. This advantageously leads to an increase in heat transfer by controlled mixing of the temperature control fluid. The diecast 15 of the second housing sidewall 14b, and the diecast 15 of the housing base 13, are designed analogously to the diecast 15 of the first housing sidewall 14a and accordingly likewise have the structure 40 described and the flow elements 41 in the respective channel 22 of the channel region 21.

FIG. 4 shows a perspective bottom view of an inventive battery housing according to FIG. 1 without cover elements. The flow direction of the temperature control fluid is described by way of example with regard to FIG. 3. FIG. 4 illustrates, by way of example, the design of the diecast 15 of the housing base 13 with the channel region 21. It should be emphasized here that the channel diameter of the channel 22 of the housing base 13 may differ from the channel diameter of the channel 22 of the respective housing sidewall 14a,b. In particular, the channel diameter of the channel 22 of the housing base 13 is greater than the channel diameter of the channel 22 of the respective housing sidewall 14a,b.

FIG. 5 shows a cross-sectional view of an inventive battery housing 10 according to FIG. 1, showing three cover elements. FIG. 5 accordingly has the same components described with regard to FIG. 1. More particularly, FIG. 5 illustrates the closed channel structure 23b.

Both the housing base 13 and the first and second housing sidewall 14a,b are shown with the respective diecast 15, the channel region 21 with the groove-shaped channel 22 for formation of the open channel structure 23a and the cover element 30. The respective cover element 30 is cohesively bonded to the corresponding diecast 15. It is thus possible to form the closed, or in other words covered, channel structure 23b between the cover element 30 and the diecast 15. In other words, the closed channel structure 23b is formed between the cover element 30 and the diecast 15. The open channel structure 23a of the groove-shaped channel 22 of the channel region 21 of the diecast 15 is closed here in a fluid-tight manner by the cover element 30.

Also shown in FIG. 5 is the illustrative base cooling system of the housing base 13 and the two side cooling systems of the first housing sidewall 14a and the opposite second housing sidewall 14b. The flow regime of the temperature control fluid was described in detail by way of example with regard to FIG. 3. The battery module with the battery cells is preferably disposed in the interior 12 of the battery housing 10. In operation of the battery module, some of the heat from the battery cells may be taken up by the temperature control fluid flowing through the housing sidewalls 14a,b and the housing base 13 and hence the battery cells may be cooled.

FIG. 6 shows a perspective bottom view of an inventive battery housing 10 in a further embodiment, with no cover element shown. The construction of the battery housing 10 is analogous to FIG. 1 with the corresponding components. By contrast with FIG. 1, the housing base 13 is designed in an alternative embodiment.

More particularly, the housing base 13 has, as a section 20 of the main body 11, a diecast 15 comprising a channel region 21. The channel region 21 is divided by way of example into a first channel subregion 21a and a second channel subregion 21b. Overall, the channel region 21 is U-shaped, with the temperature control fluid being guided in a U shape through the channel region 21 of the housing base 13. The first channel subregion 21a forms the linear section, and the second channel subregion 21b the U-shaped curved section. In the first channel subregion 21a, as structure 40, a multitude of flow elements 41 for influencing the temperature control fluid is provided. The flow elements 41 take the form of circular flow projections 43 and are arranged homogeneously offset from one another in the first channel subregion 21a. More particularly, the flow projections 43 are arranged uniformly in a multitude of rows and columns and form a homogeneous pattern. In order to specifically deflect the flow of the temperature control fluid and to influence or disrupt laminar flow of the temperature control fluid, the flow projections 43 project into the first channel subregion 21a in order for temperature control fluid to flow around them in operation of the battery module.

A multitude of flow elements 41 for influencing the temperature control fluid is provided as structure 40 in the second channel subregion 21b. The flow elements 41 take the form of U-shaped curved flow-guiding partitions 42. By way of example, four flow-guiding partitions 42 are formed, which divides the second channel subregion 21b into five channels 22. The inner channel has the shortest length, and the channel 22 disposed on the outside at the corners of the housing base 13 has the greatest length. In addition, the channels 22 of the second channel subregion 21b have different channel diameters, where the channel diameter increases outward in radial direction. Proceeding from the center of the diecast 15 of the housing base 13, the radial direction extends in each case to the corners of the diecast 15 of the housing base 13. By way of example, the channel diameter of the channels 22 of the second channel subregion 21b increases outward in the direction of the corners of the diecast 15 in radial direction. In other words, the channel diameter of the first, inner channel 22 is less than the channel diameter of the fifth, outer channel 22. This has the particular advantage that the different channel diameters can homogenize the pressure drop in the channels 22. In addition, it is especially possible to avoid dead zones in the flow of the temperature control fluid in the region of the corners of the diecast 15.

FIG. 7 shows a perspective bottom view of an inventive battery housing according to FIG. 6, showing a cover element 30. The battery housing 10 is designed by way of example according to FIG. 6. In an illustrative manner, the cover element 30 is cohesively bonded to the diecast 15 of the housing base 13. The channel region 21 of the diecast 15 of the housing base 13, in FIG. 6, is designed with a first channel subregion 21a and a second channel subregion 21b. The corresponding cover element 30 has a structure 40 corresponding to the second channel subregion 21b, formed by way of example by means of a multitude of flow elements 41. More particularly, the flow elements 41 are integrated into the cover element 30 and designed as flow-guiding partitions 42. The flow-guiding partitions 42 of the cover element 30 project into the second channel subregion 21b. In a corresponding manner to the flow-guiding partitions 42 (not shown here) of the diecast 15 of the housing base 13, the channels 22 of the cover element 30 formed by the flow-guiding partitions 42 are designed with different channel diameters. By way of example, it is envisaged in FIG. 7 that both the cover element 30 and the diecast 15 of the housing base 13 have the inventive structure 40. The structure 40 is integrated here in each case into the cover element 30 and into the diecast 15.

FIG. 8 shows a perspective exploded view of an inventive battery housing 10 in a further embodiment, showing the cover element 30. The construction of the battery housing 10 is analogous to FIG. 1 with the corresponding components. By contrast with FIG. 1, the housing base 13 is designed in an alternative embodiment.

More particularly, the housing base 13 has a diecast 15 comprising a channel region 21 with a U-shaped channel 22. The cover element 30 may be cohesively bonded to the diecast 15 to form a closed channel structure 23b.

By way of example, the cover element 30, in the channel region 21 of the diecast 15, has a structure 40 around which temperature control fluid can flow for increasing heat transfer. The structure 40 is integrated into the cover element 30. The structure 40 is formed by way of example as a multitude of flow elements 41 arranged homogeneously offset from one another in the channel region 21. The flow elements 41 are designed, for example, as circular flow projections 43. The flow elements 41 are preferably arranged in parallel rows. In order to deflect the flow of the temperature control fluid in a controlled manner and to influence or disrupt laminar flow of the temperature control fluid, the flow projections 43 project into the channel region 21 of the corresponding diecast 15, in order for temperature control fluid to flow around them in operation of the battery module.

Figure 9A:
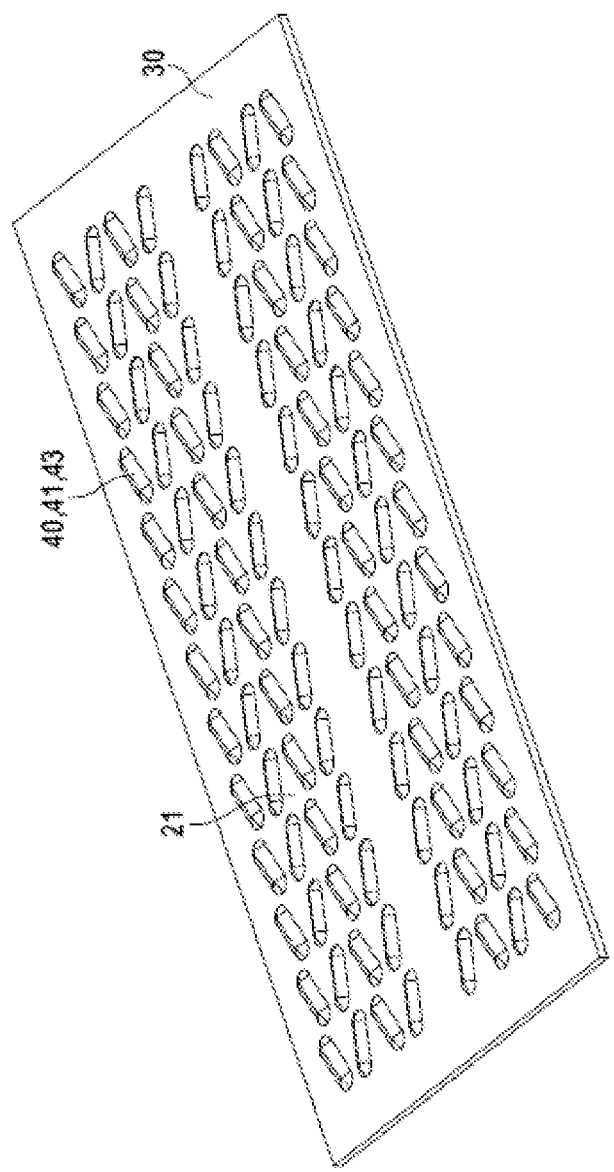
Figure 9B:
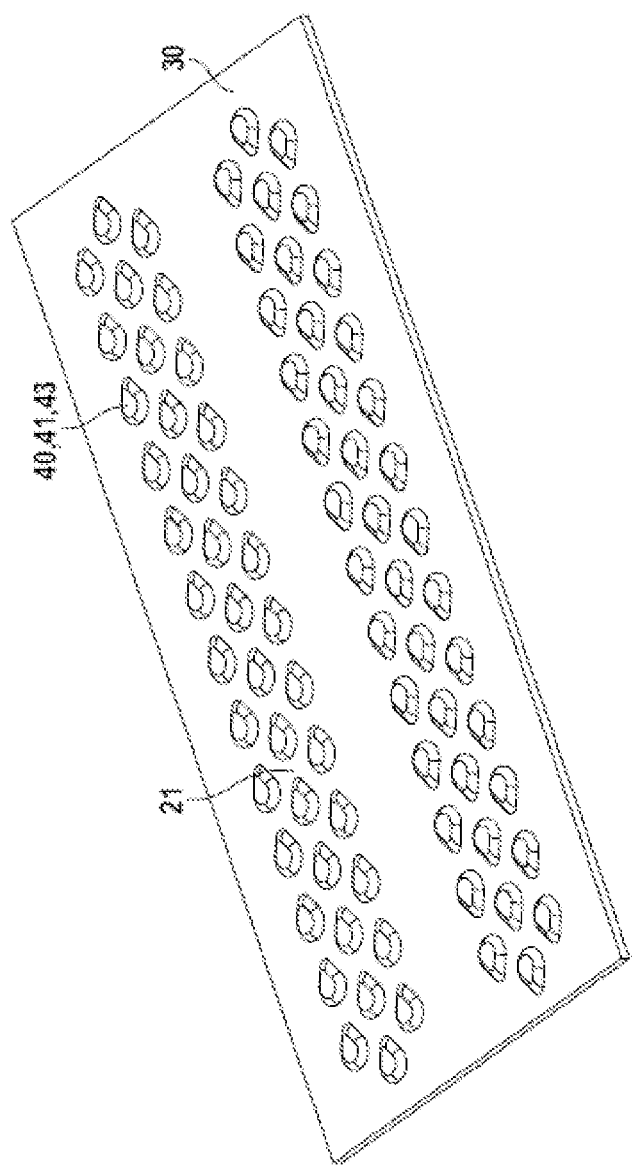

FIGS. 9a,b each show a perspective view of a cover element 30 for a battery housing of the invention in a further embodiment. The cover element 30 in the channel region 21 has a structure 40 around which temperature control fluid can flow for increasing heat transfer. The structure 40 is integrated into the cover element 30. In addition, the structure 40 is formed in each case in FIG. 9a and in FIG. 9b as a multitude of flow elements 41 arranged homogeneously offset from one another in the channel region 21. In FIG. 9a, the flow elements 41 take the form of rod-shaped flow projections 43. By contrast, the flow elements 41 in FIG. 9b take the form of droplet-shaped flow projections. The flow elements 41 are preferably arranged in parallel rows. In order to deflect the flow of the temperature control fluid in a controlled manner and to influence or disrupt laminar flow of the temperature control fluid, the flow projections 43 project into the channel region 21 of the corresponding diecast 15 in order for temperature control fluid to flow around them in operation of the battery module. In general, all kinds of combinations of geometrically different flow elements 41 are conceivable for the structure 40.

What is claimed is:

1. A battery housing (10) for a battery module, wherein the battery housing (10) has a main body (11) having an interior (12) for arrangement of at least one battery cell of the battery module, the main body (11) having a housing base (13) and having two housing sidewalls (14a,b), wherein the housing base (13) and the two housing sidewalls (14a, b), in order to increase a temperature control area and/or to increase crash security of the battery housing, each have a die-cast part (15) having a channel region (21) comprising at least one groove-shaped channel (22) configured to convey temperature control fluid for controlling the temperature of the at least one battery cell of the battery module, wherein each channel region (21) is covered by at least one cover element (30) in a fluid-tight manner to form a closed channel structure (23b), wherein one of the cover elements (30) and/or one of the die-cast parts (15), in its respective channel region (21), has at least one structure (40) configured to have the temperature control fluid flow around the structure to increase heat transfer, and wherein the respective cover element is cohesively bonded to the respective one of the die-cast parts by friction stir welding.

2. The battery housing (10) according to claim 1, characterized in that the battery housing (10) has at least one thermal contact element for contacting of the at least one battery cell of the battery module with the battery housing (10), wherein the thermal contact element is a gap pad or a gap filler or a thermally conductive adhesive or a thermally conductive encapsulating compound.

3. The battery housing (10) according to claim 1, characterized in that the structure (40) takes the form of a multitude of flow elements (41) for influencing the flow of the temperature control fluid, wherein the flow elements are arranged offset to one another within the respective channel region (21).

4. The battery housing (10) according to claim 3, characterized in that the multitude of flow elements (41) takes the form of a multitude of flow-guiding partitions (42) or of a multitude of flow projections (43).

5. The battery housing (10) according to claim 1, characterized in that the structure (40) is integrated into the respective cover element (30) and/or the respective die-cast part (15).

6. The battery housing (10) according to claim 1, characterized in that each channel region (21) has multiple channels (22) having different channel diameters.

7. The battery housing (10) according to claim 1, characterized in that each at least one groove-shaped channel (22) is in U-shaped or meandering form in the respective channel region (21).

8. The battery housing (10) according to claim 1, characterized in that the battery housing (10) has at least one thermal contact element for contacting of the at least one battery cell of the battery module with the battery housing (10).

9. A battery module having a battery housing (10) according to claim 1, wherein at least one battery cell is disposed in the interior (12) of the battery housing (10).

10. The battery housing (10) according to claim 1, characterized in that the structure (40) takes the form of a multitude of flow elements (41) for influencing the flow of the temperature control fluid, wherein the flow elements are arranged offset to one another homogeneously within the respective channel region (21).

11. The battery housing (10) according to claim 3, characterized in that the multitude of flow elements (41) takes the form of a multitude of flow-guiding partitions (42) or of a multitude of flow projections (43) that are circular or droplet-shaped or rod-shaped, or of a combination thereof.

12. The battery housing (10) according to claim 1, characterized in that the structure (40) is integrated into the respective cover element (30) and/or the respective die-cast part (15) by a deep drawing method.

13. The battery housing (10) according to claim 1, characterized in that each channel region (21) has multiple channels (22) having different channel diameters, wherein the channel diameters of the respective multiple channels increase outward in radial direction away from an innermost channel (22) of the multiple channels (22).

14. The battery housing (10) according to claim 1, wherein one of the cover elements (30) and one of the die-cast parts (15), in its respective channel region (21), has the at least one structure (40) configured to have the temperature control fluid flow around the structure to increase heat transfer.

15. A motor vehicle having a battery module according to claim 9.

16. An electrical or hybrid vehicle having a battery module according to claim 9.

* * * * *